Figures 1, 5:
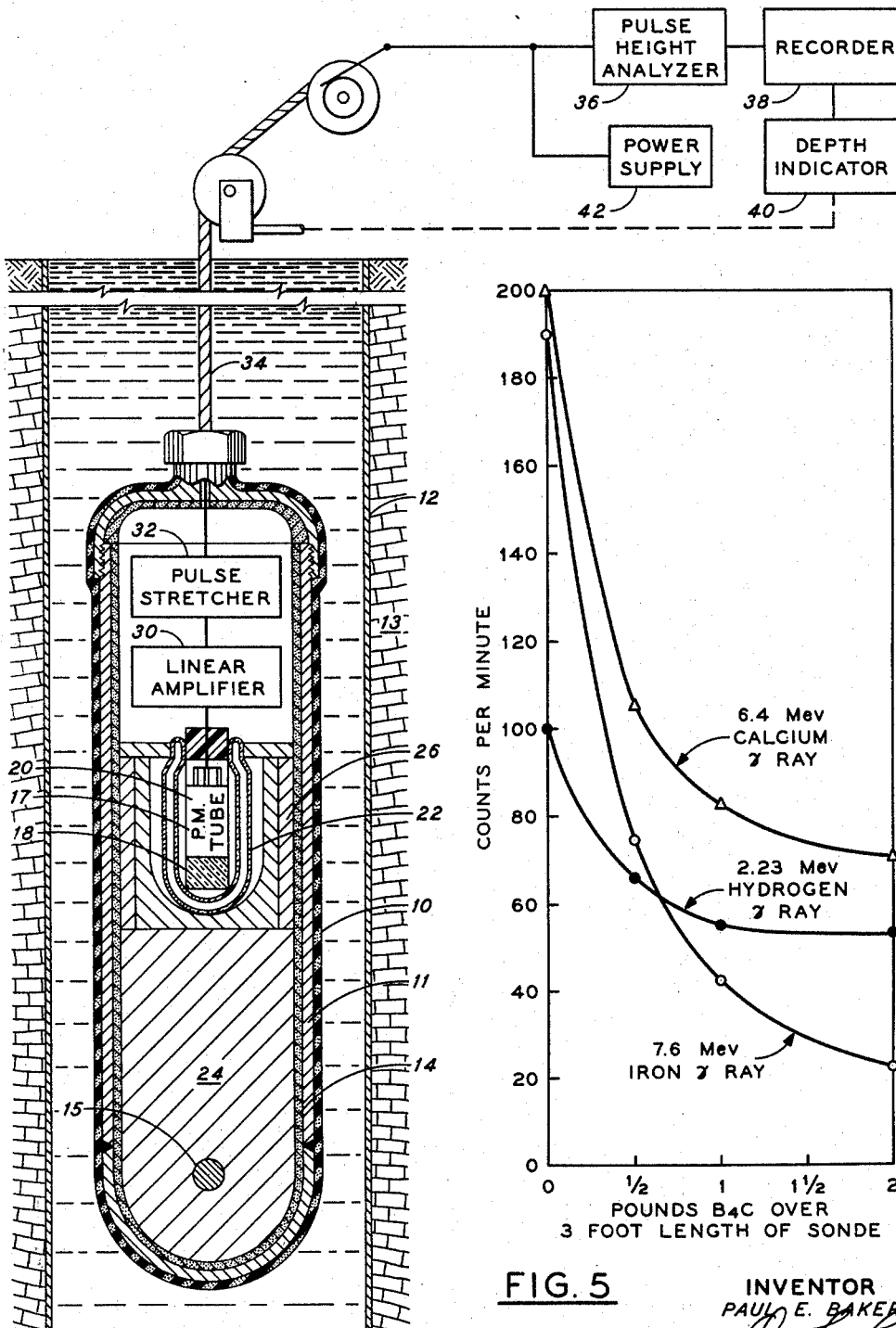

Oct. 27, 1959 P. E. BAKER 2,910,591
CARBON LOGGING THROUGH CASING
Filed Sept. 24, 1956 2 Sheets-Sheet 2

INVENTOR
PAUL E. BAKER
BY
ATTORNEYS

United States Patent Office 2,910,591
Patented Oct. 27, 1959

2,910,591

CARBON LOGGING THROUGH CASING

Paul E. Baker, Anaheim, Calif., assignor to California Research Corporation, San Francisco, Calif., a corporation of Delaware Application September 24, 1956, Serial No. 611,678

6 Claims. (Cl. 250—71)

The present invention relates to neutron-induced gamma radiation logging, and more particularly to a method for developing neutron-induced gamma ray spectra from carbon in an uncased or cased well bore.

It is a particular object of the present invention to develop neutron-induced gamma ray spectra from an unknown earth formation traversed by a well bore that is cased or uncased without interference in detection of neutron-induced gamma rays from carbon in oil in formation rock by the characteristic spectral peaks due to neutron-capture gamma rays generated by the formation itself, the iron in the well casing, or the iron in the housing for the neutron source and detector. In accordance with the invention there is provided a neutron-absorbing material surrounding the well logging sonde and interposed between the logging sonde and the well casing and in intimate contact with at least the iron housing of the neutron source and detector. In accordance with one form of the invention a water solvent, or well-fluid solvent, material containing boron is introduced into the cased well bore at least throughout the depth interval where the gamma ray spectra are to be developed from the formation. In accordance with another form of the invention the logging sonde is coated over substantially its entire exposed surface with a coating material containing boron in a comminuted form.

In developing gamma ray spectra from unknown earth formations by irradiation with fast neutrons, it has heretofore been considered difficult if not impossible to develop such spectra in a steel or iron cased well. Additionally, it has been considered difficult to generate such spectra when the logging sonde itself is constructed of steel or other material containing a high percentage of iron. The primary reason for such difficulty is that the iron nuclei in both the casing and the logging sonde have a very large cross-section, or affinity, for thermal neutrons. Unfortunately, when thermal neutrons are captured by iron nuclei there are generated two gamma rays of quite high energy. One of these iron gamma rays has an initial energy of 7.6 m.e.v. and the other has an energy of 6.0 m.e.v. Such energy gamma rays lie within the energy ranges of other important gamma rays that must be analyzed to detect the presence of various sedimentary rocks, such as limestone, wherein calcium gamma rays of 6.4 m.e.v. initial energy are to be detected. Sandstones containing silicon nuclei generate a gamma ray having an energy of 4.95 m.e.v. All of these gamma rays interfere with gamma rays from carbon induced by fast neutrons, preventing an accurate measurement of the amount of carbon in the formation and, hence, for clean sandstone, the presence of oil in the sandstone. For the foregoing reasons it has therefore been considered too difficult to obtain representative spectra under normal logging conditions where the neutron source is positioned within a steel sonde or housing or in an iron cased well bore.

In accordance with the present invention I have found it possible to reduce greatly the effect of thermal neutron-capture gamma rays from iron and other elements on the fast neutron-induced gamma ray spectra from carbon by surrounding the logging sonde with a material containing a high percentage of boron or other materials having large capture cross-sections for thermal neutrons. In one method of carrying out the invention, said boron may be placed intermediate to the logging sonde housing and the steel casing within the well bore by introducing borax into the well fluid at a concentration of about 4 lbs. per 5 gallons of well fluid.

In another method of carrying out the present invention the housing of the logging sonde is desirably coated with adhesive or plastic material containing either elemental boron or granular boron carbide. The inner surface of said logging sonde is likewise coated with a boron-containing material so that there is present a material having a much larger neutron-capture cross-section than the formation rock or the iron of either the logging sonde or the casing. By the use of boron in the foregoing manner and in immediate contact with the logging tool I have found it possible to greatly suppress the number of high-energy neutron-capture gamma rays from all sources. A large fraction of the thermal neutrons are preferentially absorbed by the boron which also generates gamma rays, but said gamma rays are of sufficiently low energy that they do not appreciably interfere with the analysis of the gamma ray spectrum that is desired to be developed from the formation. Thermal neutron-capture gamma rays from boron have an energy of only about ½ m.e.v. so that they can be readily eliminated in the detection process.

There is made possible by the positioning of boron in intimate contact with the iron surrounding the logging sonde and interposed between the logging sonde and the well casing an apparatus capable of detecting the presence of carbon and oxygen from the inelastic scattering of fast neutrons. In this method of operating the present invention fast neutrons will interact with carbon by the inelastic scattering process to generate gamma rays having energies of about 4.5 m.e.v. and 6.0 m.e.v. respectively from carbon and oxygen. Neutrons of sufficiently high energy to produce these gamma rays of inelastic scattering may be produced by radioactive sources such as radium-beryllium or polonium-beryllium, or in a particle accelerator in which, for example, a tritium target is bombarded with high-energy deuterons. However, as the irradiation of the formation continues for a finite time, each neutron, starting with high energy, eventually becomes thermalized and finally captured. The number of neutron-capture gamma rays having energies both greater and less than the gamma rays from inelastic scattering of fast neutrons or from neutron-induced reactions normally overshadows any difference in the number of fast neutron-induced gamma rays representing said energies of carbon and oxygen. By providing a complete shielding surrounding the logging sonde and interposed between the logging sonde and the well casing or wall of an open bore hole there is provided a preferential sink or absorber for thermal neutrons in the vicinity of the well bore. Such thermal neutrons will normally be in this area, since a common interaction between fast neutrons and other nuclei is the interaction with hydrogen nuclei and the hydrogen nuclei most effective are those in the immediate vicinity of the source and in particular in the well bore adjacent the logging sonde.

Further objects and advantages of the present invention will become apparent from the following detailed description taken in conjunction with the drawings, which form an integral part of the present specification.

Figure 4:
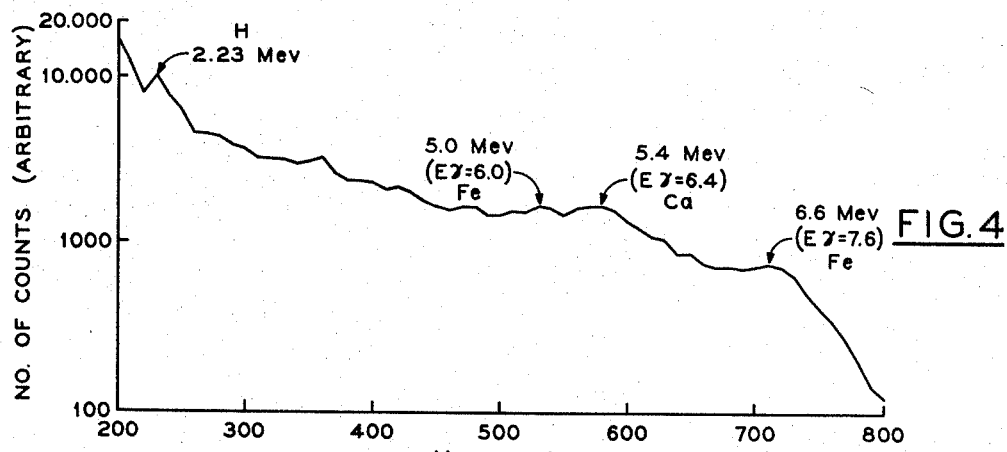
Figure 3:
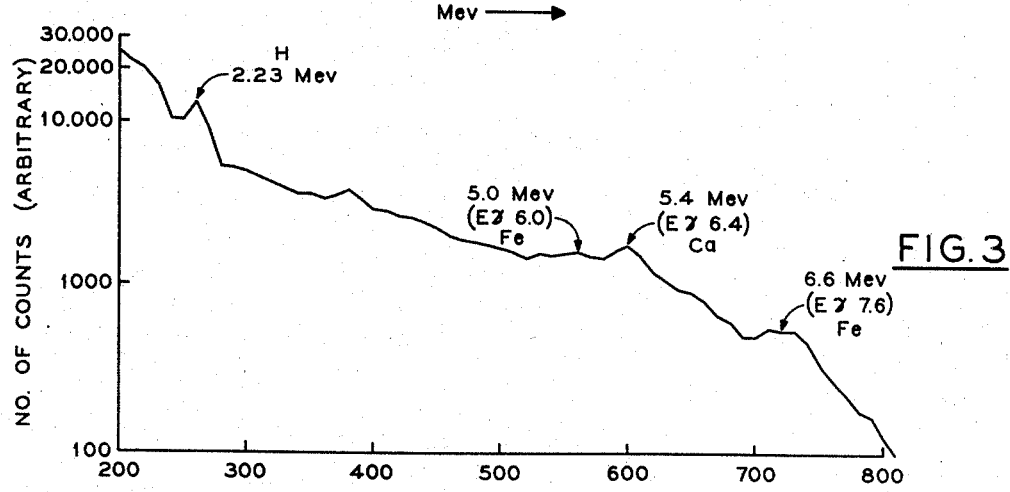
Figure 2:
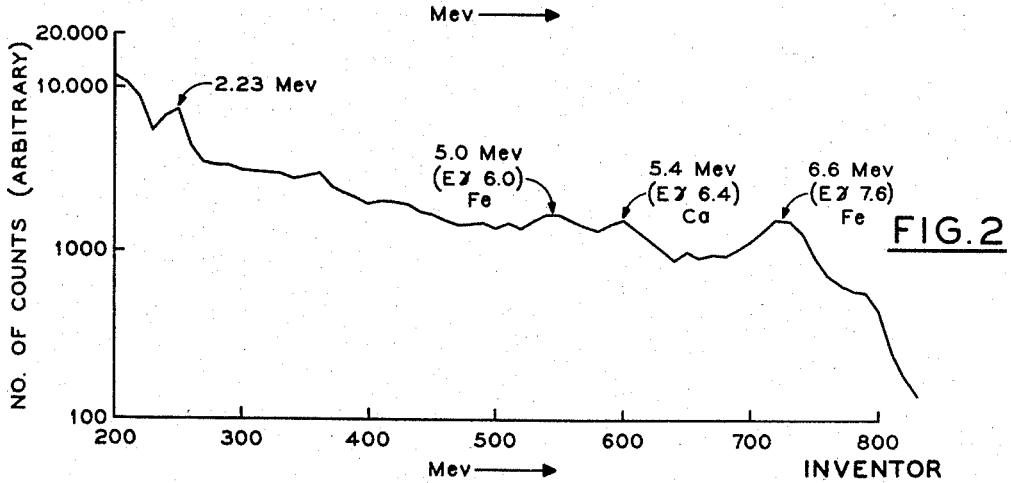

In the drawings:

Fig. 1 is a schematic elevation view of a logging sonde constructed in accordance with one form of the present invention and as it is used in logging a cased well bore;

Figs. 2, 3, and 4 are representative neutron-induced gamma ray spectra illustrating the comparative effects of iron on said spectra under different arrangements of shielding the well bore and the logging sonde; and Fig. 5 illustrates the effect of adding boron carbide in varying amounts to the surface of the logging sonde.

Referring now to the drawings, and in particular to Fig. 1, there is shown a typical neutron-induced gamma ray spectroscopy logging sonde to which the present invention has been applied. In said form of apparatus a coating 10 of boron carbide in comminuted form is bonded to a latex or rubber-like consistency and applied to the desired thickness over the entire surface of the well logging sonde housing 11. Said coating is desirably in firm and adhesive contact with housing 11 and, as illustrated, is so positioned to be intermediate to the steel or iron contained in housing 11 and the well casing 12. In this example the well is depicted as being a cased hole rather than an open hole. It will be understood that many of the same advantages of my invention can be attained by use thereof in an open bore hole.

In order to investigate the elementary structure of rock 13, it has, of course, been proposed heretofore to irradiate said formation with fast neutrons from a neutron source such as that schematically illustrated as 15. Such a source may be radium-beryllium, but is preferably a polonium-beryllium generating mainly neutrons and only a few gamma rays; alternatively, it may be a charged-particle accelerator. The neutron-induced gamma radiation is then detected in a scintillation counter such as 17, which comprises a crystal 18, for example, thallium-activated sodium iodide and a photomultiplier tube 20. Scintillation detector 17 is desirably housed in a Dewar flask 22 for purposes of thermal insulation of the detector under downhole temperature conditions.

Interposed between neutron source 15 and scintillation detector 17 is a gamma ray shielding material such as bismuth block 24. Bismuth shielding 24 absorbs gamma rays coming from neutron source 15 but permits fast neutrons to penetrate said shielding to reach formation 13. Further shielding, also desirably formed of bismuth, forms an enclosure 26 for scintillometer 17. The reason for forming shield 26 of bismuth is that bismuth has a relatively low neutron-capture cross-section and generates only a few gamma rays of the same general energy range as the desired fast neutron-induced gamma ray spectra.

In developing the normal neutron-capture gamma ray spectra, each individual gamma ray detected in crystal 18 generates an electrical impulse through a photomultiplier tube 20 that is then amplified, for example by linear amplifier 30. Such a pulse, having an amplitude comparable to the gamma ray energy, is then desirably stretched in length by pulse stretcher 32, so that said pulse may be transmitted over an essentially D.C. transmission line formed by well logging cable 34, which may have a length of upwards of 10,000 feet. The transmitted pulses coming out of well logging cable 34 are then passed to a pulse height analyzer 36 which serves as a sorter and counter of the relative numbers of individual electrical pulses corresponding to the complete spectra of neutron-induced gamma radiation. These energy distributions will extend from substantially zero energy to about 8 or 9 m.e.v. The lower energies between, say zero and 2 m.e.v., are desirably eliminated either in the linear amplifier 30 or in pulse height analyzer 36, so that the spectra generally run from energies slightly below 2.23 m.e.v., the primary gamma ray produced by neutron capture in hydrogen, and about 7 m.e.v.

Pulse height analyzer 36 may record either in individual channels or groups of pulses having at least a minimum value and a maximum value. The combination of all of the channels are then recorded, for example, on recorder 38. A suitable depth indication may be marked on the record by depth indicator 40. The power supply indicated schematically as 42 provides power for the operation of the scintillometer and the transmission circuit between sonde 11 and pulse height analyzer 36.

A typical spectrum developed through an iron-cased bore hole, such as that illustrated in Fig. 1, is presented in the pulse height curve shown in Figs. 2–4 inclusive to illustrate the operation of the boron shield. According to this invention, not only the neutron-capture gamma rays from iron, but all of the high-energy neutron-capture gamma rays, are suppressed to emphasize spectral peaks for carbon and oxygen induced by fast neutrons. Such spectra are not illustrated here, but the figures presented illustrate the operation of the boron shield and show the practicality of this invention in such detection of carbon and oxygen.

Fig. 2 specifically represents the type of pulse height spectrum obtained without the boron enclosure 10 around logging sonde 11 and without the inner boron coating 14 inside the shield forming sonde 11. As specifically indicated in Fig. 2, it will be noted that the neutron-capture gamma rays from iron present an inordinately high peak in the 6.6 m.e.v. energy region. In the present instance the energy of the iron gamma ray is 7.6 m.e.v., but by selection of the size of crystal 18 there is effectively recorded the pair production peak that results when a gamma ray is detected by electron-positron pair production, and the two gamma rays from annihilation of the positron subsequently escape the detection crystal. When both annihilation quanta escape from the crystal, a net loss of 1.0 m.e.v. results. Hence the 7.6 m.e.v. gamma ray is indicated as being recorded as a 6.6 m.e.v. gamma ray. Similar reductions in the 6.4 m.e.v. energy of the recorded gamma rays from calcium present in limestone are observed. The 6.0 m.e.v. gamma ray also due to iron, in casing 12 and sonde housing 11, has been measured as a 5.0 m.e.v. gamma ray. The reference, or position marking, gamma ray is produced by hydrogen at 2.23 m.e.v. and results from absorption of the entire energy of the neutron-capture gamma ray from hydrogen in the detector.

In each of the Figs. 2–4 the relative height of the calcium gamma ray peak recorded as 5.4 m.e.v. and resulting from an initial gamma ray energy of 6.4 m.e.v. depends for its amplitude upon the relative number of iron gamma rays detected by crystal 18. As mentioned above, the curve Fig. 2 was developed with no shielding around or in intimate contact with the logging housing 11. Fig. 3, on the other hand, which shows marked prominence of the calcium gamma ray, was made with a coating 10 and coating 14, each having 1 lb. of boron carbide incorporated in the plastic material coating both the inside and the outside of the housing. Fig. 4, which likewise shows a prominence to the calcium gamma rays, was developed with the logging sonde immersed in a steel casing, in which a borax solution in the ratio of 1 lb. of borax per gallon of water is present and in intimate contact with steel logging sonde 11 and the well casing 12.

In both Figs. 3 and 4 it will be noted that the presence of the boron in intimate contact with steel logging sonde 11 and also interposed between logging sonde 11 and casing 12 markedly reduces the prominence of the iron neutron-capture gamma ray at both the 6.6 m.e.v. interval and the 5.0 m.e.v. interval. While the total number of counts is somewhat reduced by the presence of a boron compound or mixture, such reduction in the number of counts can easily be compensated for by a more prolific neutron source In each of the foregoing cases the formation under investigation was limestone and water. Hence there is present in each of the curves the hydrogen gamma ray giving a reference point for interpretation of the relative point for interpretation of the relative pulse heights on each curve.

There is illustrated in Fig. 5 the relative reduction in the number of counts per minute with increasing amounts of boron compound such as boron carbide applied over a three-foot length of the logging sonde. Said three-foot length was selected as a reference value, since in general this would comprehend complete enclosure of the space between source 15 and scintillometer 17. In practice with a polonium-beryllium source, scintillometer 17 would be spaced from 8"–12" from source 15 so that a 3-foot length of sonde would effectively be an infinite distance above and below source 15 and scintillometer 17. As shown in Fig. 5, the iron gamma ray is more drastically depressed by the presence and intimate contact therewith of the boron carbide as compared to reduction in number of counts per minute for either the hydrogen gamma ray or the calcium gamma ray, both of which are indicative of the constituent elements present in formation 13. Accordingly, it will be seen that the presence of the boron compound substantially surrounding the scintillometer and the source provide an effective reduction in the number of thermal neutrons in and about the well bore itself. It is particularly advantageous in the detection of carbon by the 4.5 m.e.v. gamma rays produced by inelastic scattering of fast neutrons that the intensity of the neutron-capture gamma rays from iron be reduced.

With the addition of sufficient boron between housing 11 and casing 12, there is provided then by the present invention a method of detecting the presence of gamma rays from neutron inelastic scattering of oxygen and carbon nuclei. Such gamma rays from inelastic scattering of fast neutrons arise from a preferential interaction of the nuclei with only the higher energy neutrons insofar as production of these gamma rays is concerned. The prime difficulty heretofore in detecting such gamma rays from carbon and oxygen has been due to the presence of neutron-capture gamma rays of substantially the same energy. Accordingly, by providing a sink or absorber for all thermal neutrons diffusing in and out of the bore hole, there is possible the suppression of virtually the entire neutron-capture gamma radiation spectrum. By such suppression of any neutron-capture radiation having energies greater than the ½ m.e.v. normally generated by capture of neutrons in boron, there is preserved only the gamma rays from inelastic scattering and other interactions of fast neutrons. In normal sedimentary rocks, such as those drilled in exploring for oil, the only important gamma rays remaining in the spectra of energies about 4–6 m.e.v. will be those due respectively to carbon and oxygen. Specifically, the gamma rays from inelastic scattering of fast neutrons off carbon will have initial energies of 4.4 m.e.v. and those from oxygen 6.0 m.e.v. These will appear as 3.4 m.e.v. gamma rays and 5.0 m.e.v. gamma rays on the neutron-induced gamma ray spectra. By using this method to suppress the neutron-capture radiation, the gamma ray spectrum from inelastic scattering of fast neutrons is relatively enhanced, thereby permitting identification of gamma rays that are otherwise present but not identifiable. The source of fast neutrons to produce such gamma rays may be either an accelerator or a radioactive source such as Ra—Be or Po—Be.

Various modifications and changes in the preferred embodiments of the invention disclosed hereinabove will occur to those skilled in the art, and all such modifications falling within the scope of the appended claims are intended to be included therein.

I claim:

1. The method of detecting carbon and oxygen in an earth formation traversed by a steel cased well bore which comprises the steps of introducing a fast neutron source into a well bore having a steel casing between said well bore and the surrounding earth formation whose carbon and oxygen content is to be measured, irradiating said formation with fast neutrons to generate gamma rays through inelastic scattering between carbon and oxygen nuclei and the fast neutrons, positioning a scintillation detector adjacent said formation and a predetermined distance from said neutron source, positioning in the space between the steel casing of said well bore and both said source and said detector an amount of boron sufficient to substantially suppress the number of thermal neutrons available for capture by nuclei in and around said well bore, the adjacent formation the casing, detecting the characteristic gamma ray energies from said inelastic scattering process generating gamma rays having initial energies of 4.4 m.e.v. from carbon and 6.0 m.e.v. from oxygen, measuring the relative quantity of each of said gamma rays from inelastic neutron scattering over a predetermined time interval and recording said quantities in accordance with the depth of said detector in said well bore.

2. The method of detecting carbon and oxygen in an earth formation traversed by a well bore which comprises the steps of introducing a fast neutron source into a well bore, irradiating said formation with fast neutrons to interact with carbon and oxygen nuclei therein to generate gamma rays through inelastic scattering between said nuclei and the fast neutrons, positioning a scintillation detector adjacent said formation and in the presence of said neutron source, positioning in the space between the wall of said well bore and both said source and said detector an amount of boron sufficient to substantially suppress the number of thermal neutrons available for capture by nuclei in and around said well bore and the adjacent formation, detecting the characteristic gamma ray energies from said inelastic scattering process generating gamma rays having initial energies of 4.4 m.e.v. from carbon and 6.0 m.e.v. from oxygen, measuring the relative quantity of each of said gamma rays from inelastic neutron scattering over a predetermined time interval, and recording said quantities in accordance with the depth of said detector in said well bore.

3. The method of detecting carbon and oxygen in an earth formation traversed by a cased well bore which comprises the steps of introducing a pressure resistant steel logging sonde containing a fast neutron source a scintillation detector and shielding material therebetween into a well bore having a steel casing between said well bore and the surrounding earth formation whose carbon and oxygen content is to be measured, irradiating said formation with fast neutrons from said source to generate gamma rays through inelastic scattering between carbon and oxygen nuclei in said formation and the fast neutrons, substantially surrounding said steel sonde above and below both said source and said detector with an amount of boron sufficient to substantially suppress the number of thermal neutrons available for capture by other nuclei in and around said well bore, the adjacent formation, the logging sonde, and the casing, detecting the characteristic gamma ray energies from said inelastic scattering process generating gamma rays having initial energies of 4.4 m.e.v. from carbon and 6.0 m.e.v. from oxygen, measuring the relative quantity of each of said gamma rays from inelastic neutron scattering over a predetermined time interval, and recording said quantities in accordance with the depth of said sonde in said well bore.

4. The method of suppressing the effect of neutron-capture gamma rays from iron nuclei on a gamma ray spectra generated by the simultaneous interactions of fast and thermal neutrons with nuclei in an earth formation penetrated by a well bore having an iron casing, the neutron source and gamma ray energy detector being adjacent each other and within a logging sonde housing constructed of iron, which comprises positioning between the outside of said iron housing and said earth formation a thermal neutron absorbing material containing therein boron nuclei sufficient in quantity to substantially suppress the number of thermal neutrons within said well bore, said material extending throughout the length of said well bore wherein said gamma ray spectra is generated and at least substantially above and below both said neutron source and said gamma ray energy detector, said length of thermal neutron absorbing material interposing between said detector and the earth formation around said well bore a sink for thermal neutrons diffused therein, spectroscopically detecting the gamma rays generated by simultaneous irradiation of said formation with fast and thermal neutrons, and recording the relative quantities of gamma rays having initial energies of 4.4 m.e.v. and 6.0 m.e.v. as an indication respectively of the presence of carbon and oxygen in said formation, said gamma rays being generated by inelastic scattering of fast neutrons from said source.

5. Apparatus for detecting gamma rays resulting from inelastic scattering of fast neutrons by carbon and oxygen which comprises a steel-enclosed logging sonde adapted to be supported on the end of a well logging cable, a fast neutron source positioned within said logging sonde, a gamma ray energy detector within said sonde positioned adjacent said fast neutron source, shielding material intermediate said gamma ray detector and said fast neutron source, and a coating of adhesive material on the exterior surface of said sonde containing therein boron nuclei in sufficient quantity to substantially suppress the number of thermal neutrons resulting from the slowing down of fast neutrons within fluids in said well bore and in the surrounding earth formations traversed by said well bore, said coating extending substantially above and below both the source and said gamma ray energy detector to substantially completely cover the steel enclosure of said logging sonde, and means for spectroscopically measuring the gamma rays detected by said gamma ray detector, and means for recording the relative quantities of gamma rays having initial energies of 4.4 m.e.v. and 6.0 m.e.v. as an indication respectively of the presence of carbon and oxygen in said formation, said gamma rays being generated by inelastic scattering of fast neutrons emitted from said source by said oxygen and carbon nuclei, said recording being in accordance with the depth of said logging sonde in the well bore.

6. The method of suppressing the effect of neutron-capture gamma rays from iron nuclei on a gamma ray spectra generated by the simultaneous interaction of fast and thermal neutrons with nuclei in an earth formation traversed by a well bore, wherein a fast neutron source and a gamma ray energy detector are adjacent each other and mounted within a logging sonde having a steel pressure-resistant housing, which comprises the steps of positioning between the outside of said steel housing and said earth formation a thermal neutron absorbing material containing therein boron nuclei in sufficient quantity to substantially suppress the number of thermal neutrons in and around said well bore, said material extending throughout the length of said well bore wherein said gamma ray spectra is generated and at least substantially above and below both said neutron source and said gamma ray energy detector, said length of thermal neutron absorbing material interposing between said housing and the earth formation around said well bore a sink for thermal neutrons diffused therein, detecting the gamma rays generated by simultaneous irradiation of said formation with fast and thermal neutrons, and spectroscopically recording the quantities of gamma rays having initial energies above at least 2 m.e.v. as an indication of the presence of a plurality of unknown nuclei within said formation with the gamma rays arising from capture of thermal neutrons by iron nuclei in said steel housing substantially suppressed, said recording being in accordance with the depth of said sonde housing in said well bore.

References Cited in the file of this patent
UNITED STATES PATENTS

| | | |
|---|---|---|
| 2,721,944 | Ruble | Oct. 25, 1955 |
| 2,752,504 | McKay | June 26, 1956 |
| 2,782,318 | Herzog | Feb. 19, 1957 |
| 2,785,314 | Grahame | Mar. 12, 1957 |

UNITED STATES PATENT OFFICE
CERTIFICATE OF CORRECTION

Patent No. 2,910,591                                             October 27, 1959

Paul E. Baker

It is hereby certified that error appears in the printed specification of the above numbered patent requiring correction and that the said Letters Patent should read as corrected below.

Column 6, line 9, after "formation" insert -- and --; line 41, after "source" insert a comma.

Signed and sealed this 10th day of May 1960.

(SEAL)
Attest:

KARL H. AXLINE
Attesting Officer

ROBERT C. WATSON
Commissioner of Patents